United States Patent Office 3,466,287
Patented Sept. 9, 1969

3,466,287
1-[(3-INDOLYL)-LOWER-ALKYL]-4-SUBSTITUTED PIPERAZINES
Sydney Archer, Bethlehem, N.Y., assignor to Sterling Drug Inc., New York, N.Y., a corporation of Delaware
No Drawing. Continuation-in-part of application Ser. No. 584,983, Oct. 7, 1966. This application Oct. 23, 1967, Ser. No. 677,036
Int. Cl. C07d 57/00; A61k 25/00
U.S. Cl. 260—268                                      3 Claims

ABSTRACT OF THE DISCLOSURE

New 1-[(3-indolyl)-lower-alkyl]-4-substituted piperazines having useful antiinflammatory and antibacterial activities.

---

This application is a continuation-in-part of my prior copending application Ser. No. 584,983, filed Oct. 7, 1966, now abandoned.

This invention relates to certain 1-[(3-indolyl)-lower-alkyl]-4-substituted piperazines of the formula

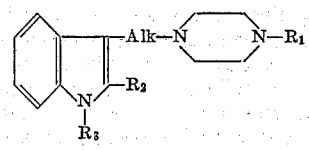

I where Alk is lower-alkylene; $R_1$ is N-lower-alkyl-3-piperidyl, N-lower-alkyl-4-piperidyl, N-lower-alkyl-3-pyrrolidyl, N-morpholinyl-lower-alkyl, N-piperidyl-lower-alkyl, N-pyrrolidyl-lower-alkyl, or N,N-di-lower-alkyl-amino-lower-alkyl; $R_2$ is hydrogen, lower-alkyl, or phenyl; and $R_3$ is hydrogen, lower-alkyl, or phenyl-lower-alkyl.

As used herein, the terms lower-alkyl and lower-alkylene mean lower-alkyl or lower-alkylene containing from one to seven carbon atoms which can be either straight or branched. Thus when $R_2$ or $R_3$ represents lower-alkyl, or when $R_1$ represents N-lower-alkyl-3- or 4-piperidyl, N-lower-alkyl-3-pyrrolidyl, N-morpholinyl-lower-alkyl, N-piperidyl-lower-alkyl, N-pyrrolidyl-lower-alkyl, or N,N-di-lower-alkylamino-lower alkyl, the said lower-alkyl groups can be methyl, ethyl, n-propyl, isopropyl, isobutyl, n-hexyl, and the like, and Alk, as lower-alkylene, can be methylene, 1,2-ethylene, 1,3-propylene, 1,4-(2-methylbutylene), 1,5-(2-ethylpentamethylene), 1,7-heptamethylene, and the like.

A number of processes for preparing 1-(indolyl-lower-alkyl)-piperazines are disclosed in U.S. Patent 3,188,313, which include alkylation of a 1-substituted-piperazine with a (3-indolyl)-lower-alkyl halide; Mannich reaction of an indole, a 1-substituted piperazine, and formaldehyde (to prepare compounds having a methylene bridge between the indole and piperazine moieties); and a number of methods involving reduction of an oxo function, either in the side chain represented by Alk in the compounds of Formula I above, or in the piperazine ring, and the compounds of the instant invention can also be prepared by these methods.

A preferred method for preparing the instant compounds comprises reducing with an alkali metal aluminum hydride a 1-[(2-indolyl)-lower-alkanoyl]-4-$R_1$-piperazine having the Formula II:

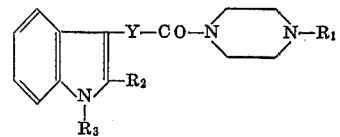

II where $R_1$, $R_2$, and $R_3$ have the meanings given above, and Y represents a single chemical bond or lower-alkylene of from one to six carbon atoms. The reaction is carried out at a temperature between about 0° C. and about 65° C. in an organic solvent inert under the conditions of the reaction, for example ether or tetrahydrofuran. It is preferred to use lithium aluminum hydride in refluxing tetrahydrofuran.

The 1-[(3-indolyl)-lower-alkanoyl]-4-$R_1$-piperazines of Formula II are in turn prepared by reacting a 3-indolyl-lower-alkanoic acid with a lower-alkyl haloformate in the presence of an acid-acceptor, for example triethylamine, at a temperature between about −20° C. and about 20° C. The reaciton is preferably carried out in an organic solvent inert under the conditions of the reaction such as anhydrous acetone, ether, ethylene dichloride, and the like. Acetone is the preferred solvent. The purpose of the acid acceptor is to take up the hydrogen halide split out during the course of the reaction and is a basic substance which forms water-soluble by-products easily separable from the product. The 3-indolyl-lower-alkane mixed anhydrides thus formed in situ are reacted with an appropriate $R_1$-substituted-piperazine at a temperature between about −20° C. and about 20° C. to give the 1-[(3-indolyl)-lower-alkanoyl]-4-$R_1$-piperazines of Formula II.

A preferred method of preparing the compounds of Formula I where Alk is methylene comprises reacting together indole (or a substituted indole), a 1-$R_1$-substituted piperazine, and formaldehyde. The reaction is known as the Mannich reaction and is usually carried out at room temperature or by warming for short periods in an organic solvent inert under the conditions of the reaction, for example dioxane or tetrahydrofuran, and the like, and in the presence of an acidic condensing agent, for example glacial acetic acid.

It has also been found that the compounds of Formula I can be prepared economically, in excellent yield, and in a high state of purity by essentially a one-step reaction involving cyclization under acid conditions of an ω-[4-$R_1$-substituted-1-piperazinyl]-lower-alkanaldehyde phenylhydrazone, ω-[4-$R_1$-substituted 1-piperazinyl]-lower-alkyl lower-alkyl ketone phenylhydrazone, or ω-[4-$R_1$-substituted-1-piperazinyl]-lower-alkyl phenyl ketone phenylhydrazone of the formula:

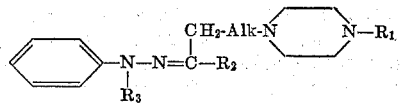

III where $R_1$, $R_2$, $R_3$, and Alk have the meanings given above.

The compounds of Formula I are prepared from the compounds of Formula III by heating the latter in the presence of an acid, for example hydrochloric acid, sulfuric acid, p-toluenesulfonic acid, glacial acetic acid, and the like, and in an organic solvent inert under the conditions of the reaction, for example methanol, ethanol, isopropanol, benzene, toluene, and the like. When glacial acetic acid is used as the acid condensing agent, it can also be used in excess as the solvent medium as well.

The reaction is represented by the equation:

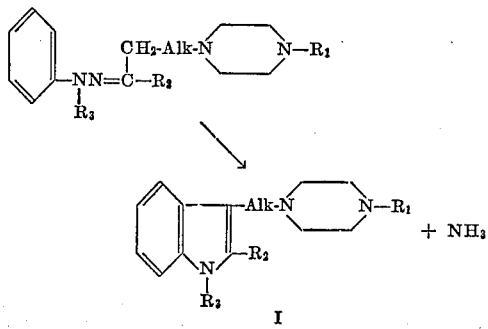

The hydrazones of Formula III in turn are prepared by reacting a phenylhydrazine of Formula IV with an ω-(4-$R_1$-substituted-1-piperazinyl)aldehyde, an ω-(4-$R_1$-substituted-1-piperazinyl)-lower-alkanone, or an ω-(4-$R_1$-substituted-1-piperazinyl)-lower-alkyl phenyl ketone of Formula V where $R_2$ is hydrogen, lower-alkyl, or phenyl, respectively. The reaction is represented by the equation:

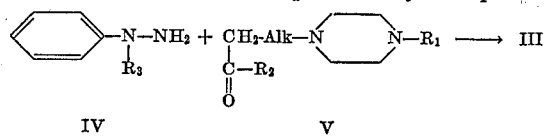

and generally takes place at room temperature. Like the cyclization of the hydrazones of Formula III to the products of Formula I, the reaction is advantageously carried out in an organic solvent inert under the conditions of the reaction, for example methanol, ethanol, isopropanol, benzene, toluene, xylene, and the like, and in the presence of an acid, for example hydrochloric acid, sulfuric acid, p-toluenesulfonic acid, glacial acetic acid, and the like.

The hydrazones of Formula III thus formed can, if desired, be isolated from the reaction mixture before cyclizing to the indole final products. It is preferred to carry the reaction to completion, without isolating the intermediate hydrazones, by heating the reaction mixture containing the hydrazone which itself is formed at lower temperatures.

In addition to the use of the 3-indolyl-lower-alkanoic acids (used to prepare the compounds of Formula II), or the indole (used in the Mannich reaction to prepare the compounds of Formula I where Alk is methylene), or the phenylhydrazine of Formula IV (used to prepare the hydrazones of Formula III), other equivalently functioning reactants may be employed to produce the desired novel compositions of this invention. For example, instead of employing unsubstituted 3-indolyl-lower-alkanoic acids, or unsubstituted indoles, or unsubstituted phenylhydrazine, such compounds substituted in the phenyl ring (or substituted in the benzene ring of the $R_2$ group as phenyl or the $R_3$ group as phenyl-loweralkyl) by halogen, lower-alkyl, lower-alkoxy, loweralkylmercapto, lower-alkylsulfinyl, lower-alkylsulfonyl, nitro, trifluoromethyl, methylenedioxy, ethylenedioxy, benzyloxy, benzyl, sulfamyl, lower-alkanoyloxy, or hydroxy can also be employed. In such instances, the same reaction conditions used in the previously described reactions would be used, and such substituted reactants afford the correspondingly substituted final products of Formula I which are considered to be the full equivalents of the unsubstituted compounds.

The novel compounds of the instant invention are the bases of Formula I and the acid-addition salts of said bases, and said acid-addition salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that Formula I not only represents the structural configurations of the bases of the invention but is also representative of the structural entity which is common to all of the compounds, whether in the form of the free bases or in the form of the acid-addition salts of the bases. It has been found that by virtue of this common structural entity, the bases of Formula I and their acid-addition salts have inherent pharmacodynamic and chemotherapeutic activity of a type to be more fully described hereinbelow. This inherent pharmacodynamic and chemotherapeutic activity can be enjoyed in useful form for pharmaceutical purposes by employing the free bases themselves or the acid-addition salts formed from pharmaceutically-acceptable acids, that is acids whose anions are innocuous to the animal organism in effective doses of the salts so that beneficial properties inherent in the common structural entity represented by the free bases are not vitiated by side-effects ascribable to the anions.

In utilizing this pharmacodynamic and chemotherapeutic activity of the salts of the invention, it is preferred of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, the salts of the compounds of Formula I are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively they can be converted to pharmaceutically-acceptable acid-addition salts by, for example, ion-exchange procedures.

It will be appreciated from the foregoing that all of the acid-addition salts of the new bases of Formula I are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new indoles, and not in any particular acid anion associated with the salt forms of the compounds; rather, the acid anions, which can be associated in the salt forms, are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The compounds of the invention have utility as antibacterial and antiinflammatory agents as determined for representative species in standard and recognized pharmacological tests as described hereinbelow.

The compounds can be prepared for use by dissolving under sterile conditions a salt form of the compounds in water (or an equivalent amount of a nontoxic acid if the free base is used), or in a physiologically compatible aqueous medium such as saline, and stored in ampoules for use by injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions, or oil-water emulsions in the same manner as conventional medicinal substances are prepared.

The chemical structures of the compounds of the invention are established by their mode of synthesis and are corroborated by infrared and ultraviolet spectra, and by the correspondence between calculated values for the elements and values found by chemical analysis.

The following examples will further illustrate specific embodiments of the invention.

Example 1.— 1-[3-(3-indolyl)propyl]-4-(N-methyl-4-piperidyl)piperazine [I: $R_1$ is 4—$C_5H_9NCH_3$; $R_2$ and $R_3$ are H; Alk is $(CH_2)_3$]

To a refluxing solution of 1560 g. (18.2 moles) of piperazine in 3.8 liters of benzene in a 12 liter flask equipped with two water traps, two condensers, a mechanical stirrer, a dropping funnel, and a nitrogen inlet tube was added over a period of three hours a solution of 1030 g. (9.1 moles) of N-methyl-4-piperidone in 500 ml. of benzene while continually flushing out the system with a slow stream of nitrogen. The mixture was refluxed for an additional seven hours during which time a total of 236 cc. of water were collected. The reaction mixture was taken to dryness, the residue was dissolved in 12.5 liters of dry isopropanol, and the mixture reduced with hydrogen over 27 g. of platinum oxide catalyst. Reduction was complete in about an hour and a half, and the mixture was filtered from the catalyst, the filtrate taken to dryness, and the residue distilled in vacuo. The fraction boiling at 102–110° C./0.1 mm. was collected as product thus giving 1370 g. of 1-(N-methyl-4-piperidyl)piperazine.

A solution of 9.46 g. (0.05 mole) of β-(3-indolyl)propionic acid and 5.5 g. (0.05 mole) of triethylamine dissolved in a total of 400 ml. of acetone was cooled to about −10° C., and to the cooled mixture was added dropwise a solution of 6.85 g. (0.05 mole) of isobutyl chloroformate in 150 ml. of acetone while maintaining the temperature at around −10° C. The mixture was then treated dropwise with a solution of 9.16 g. (0.05 mole) of 1-(N-methyl-4-piperidyl)piperazine in 200 ml. of acetone while maintaining the temperature at about −10° C. The mixture was then allowed to stand at room temperature for about fifteen hours, filtered, and the acetone filtrate set aside. The insoluble material was slurried in water and filtered giving 7.6 g. of crude product of M.P. 159–161° C. which, on recrystallization from an ethyl acetate/hexane mixture, gave 7.10 g. of product, M.P. 160.5–162.0° C. The acetone filtrate was taken to dryness, the residue dissolved in chloroform, and the solution extracted with two 150 ml. portions of 10% aqueous sodium carbonate and two 150 ml. portions of ice water. After charcoaling and drying, the chloroform was removed in vacuo, and the residual solid recrystallized from an ethyl acetate/hexane mixture to give 4.95 g. of additional product of M.P. 160–162° C. This material was combined with the 7.10 g. sample previously isolated, and the combined sample was dried in a vacuum dessicator for six hours. There was thus obtained 11.75 g. of 1-[β-(3-indolyl)propionyl] - 4 - (N - methyl - 4 - piperidyl)piperazine, M.P. 161.5–163° C. (uncorr.).

*Analysis.*—Calcd. for $C_{21}H_{30}N_4O$: C, 71.15; H, 8.53; N, 15.81. Found: C, 71.14; H, 8.63; N, 16.05.

The latter (11.75 g., 0.03 mole) was dissolved in 360 ml. of tetrahydrofuran and the solution added rapidly to a stirred slurry of 2.66 g. of lithium aluminum hydride in 300 ml. of tetrahydrofuran. The mixture was heated under reflux for six hours, allowed to stand at room temperature and then, while cooling and stirring, treated dropwise with a solution of 8 ml. of water in 40 ml. of tetrahydrofuran. Filtration of the reaction mixture, washing the filter cake with three 75 ml. portions of tetrahydrofuran and three 75 ml. portions of ether, evaporation of the combined filtrates to dryness, and recrystallization of the residue from an ethyl acetate/hexane mixture afforded 7.46 g. of 1-[3-(3-indolyl)propyl]-4 - (N - methyl - 4 - piperidyl)piperazine, M.P. 132.2–135.5° C. (corr.).

*Analysis.*—Calcd. for $C_{21}H_{32}N_4$: $N_{total}$, 16.46; $N_{basic}$, 12.34. Found: $N_{total}$, 16.54; $N_{basic}$, 12.17.

Example 2.—1-[4-(3-indolyl)butyl]4-(N-methyl-4-piperidyl)piperazine [I: $R_1$ is 4—$C_5H_9NCH_3$; $R_2$ and $R_3$ are H; Alk is $(CH_2)_4$]

γ-(3-indolyl)butyric acid (10.16 g., 0.05 mole) was reacted with 6.83 g. (0.05 mole) of isobutyl chloroformate in a total of 500 ml. of acetone and the resulting mixed anhydride reacted with 9.16 g. (0.05 mole) of 1-(N-methyl-5-piperidyl)piperazine in 200 ml. of acetone all according to the procedure described above in Example 1. The crude product was recrystallized from an ethyl acetate/hexane mixture to give 12.4 g. of 1-[γ-(3-indolyl)-butyryl]-4-(N-methyl-4-piperidyl)piperazine, M.P. 122.5–123.5° C. (uncorr.).

*Analysis.*—Calcd. for $C_{22}H_{32}N_4O$: C, 71.70; H, 8.75; N, 15.20. Found: C, 71.97; H, 8.77; N, 15.14.

The latter was reduced with 4.0 g. (0.1 mole) of lithium aluminum hydride in 300 ml. of dry tetrahydrofuran according to the procedure described above in Example 1. The crude product was isolated in the form of the free base and recrystallized from hexane giving 6.61 g. of 1 - [4 - (3-indolyl)butyl]-4-(N-methyl-4-piperidyl)piperazine, M.P. 125.0–126.2° C. (corr.).

Example 3.—1 - [3-(3 - indolyl)propyl]-4-(N-methyl-4-piperidyl)piperazine [I: $R_1$ is 4—$C_5H_9NCH_3$; $R_2$ and $R_3$ are H; Alk is $(CH_2)_3$]

Reaction of ω-chlorovaleraldehyde (prepared by oxidation of 6-chloropentanol according to the procedure described in French Patent 1,355,755) with 1-(N-methyl-4-piperidyl)piperazine in the presence of anhydrous sodium carbonate in refluxing xylene affords ω-{1-[4-(N-methyl-4-piperidyl)piperazinyl]}valeraldehyde. Reaction of the latter with phenylhydrazine in refluxing ethanol in the presence of hydrochloric acid affords 1-[3-(3-indolyl)-propyl] - 4 - (N-methyl-4-piperidyl)piperazine described above in Example 1.

Example 4.—1-[4-(3-indolyl)butyl]-4-(N-methyl-4-piperidyl)piperazine [I: $R_1$ is 4—$C_5H_9NCH_3$; $R_2$ and $R_3$ are H; Alk is $(CH_2)_4$]

Reaction of ω-chlorohexanal with 1-(N-methyl-4-piperidyl)piperazine in the presence of anhydrous sodium carbonate in xylene affords ω-{1-[4-(N-methyl-4-piperidyl)piperazinyl]}hexanal. Reaction of the latter with phenylhydrazine in refluxing ethanol in the presence of hydrochloric acid affords 1-[4-(3-indolyl)butyl]-4-(N-methyl-4-piperidyl)piperazine.

Example 5.—1-[2 - (2 - methyl - 3 - indolyl)ethyl]-4-(N-methyl-3-piperidyl)piperazine [I: $R_1$ is 3—$C_5H_9NCH_3$; $R_2$ is $CH_3$; $R_3$ is H; Alk is $CH_2CH_2$]

Reductive alkylation of piperazine with N-methyl-3-pyrrolidone [Prill and McElvain, J. Am. Chem. Soc. 55, 1233 (1933)] using the manipulative procedure described above in Example 4 affords 1-(N-methyl-3-piperidyl)piperazine.

Reaction of the latter with 5-chloro-2-pentanone in the presence of anhydrous sodium carbonate in refluxing xylene gives 1-(3-acetylpropyl)-4-(N-methyl-3-piperidyl)piperazine.

Reaction of the latter with phenylhydrazine in refluxing ethanol in the presence of hydrogen chloride affords 1-[2-(2 - methyl - 3 - indolyl)ethyl]-4-(N-methyl-3-piperidyl)piperazine.

Example 6.—1 - [2 - (2 - methyl-3-indolyl)ethyl]-4-(N-methyl-3-pyrrolidyl)piperazine [I: $R_1$ is

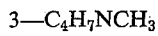

$R_2$ is $CH_3$; $R_3$ is H; Alk is $CH_2CH_2$]

Reductive alkylation of piperazine with N-methyl-3-pyrrolidone (Prill and McElvain, J. Am. Chem. Soc. 55, 1233 (1933)) using the manipulative procedure described above in Example 4 affords 1-(N-methyl-3-piperidyl)piperazine.

Reaction of the latter with 5-chloro-2-pentanone in the presence of anhydrous sodium carbonate in refluxing xylene gives 1 - (3-acetylpropyl) - 4-(N-methyl-3-pyrrolidyl)piperazine.

Reaction of the latter with phenylhydrazine in refluxing ethanol in the presence of hydrogen chloride affords 1-[2-(2 - methyl - 3-indolyl)ethyl]-4-(N-methyl-3-pyrrolidyl)piperazine.

Example 7.—1 - [2-(2 - methyl-3-indolyl)ethyl]-4-[2-(N-morpholinyl)ethyl]piperazine [I: $R_1$ is

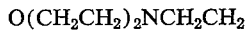

$R_2$ is $CH_3$; $R_3$ is H; Alk is $CH_2CH_2$]

Reaction of 1-(2-chloroethyl)piperazine with morpholine in the presence of anhydrous sodium carbonate in refluxing xylene affords 1-[2-(N-morpholinyl)ethyl]piperazine.

Reaction of the latter with 5-chloro-2-pentanone in the presence of anhydrous sodium carbonate in refluxing xylene affords 1-(3-acetylpropyl)-4-[2-(N-morpholinyl)ethyl]piperazine.

Reaction of the latter with phenylhydrazine in refluxing ethanol in the presence of hydrogen chloride affords 1-[2-(2 - methyl-3-indolyl)ethyl]-4-[2-(N-morpholinyl)ethyl]piperazine.

Example 8.—1-[2-(2-methyl-3-indolyl)ethyl]-4-[2-(N,N-dimethylamino)ethyl]piperazine [I: $R_1$ is

$R_2$ is $CH_3$; $R_3$ is H; Alk is $CH_2CH_2$]

Reaction of 1-[2-(N,N-dimethylamino)ethyl]piperazine with 5-chloro-2-pentanone in the presence of anhydrous sodium carbonate in refluxing xylene affords 1-(3-acetylpropyl) - 4 - [2-(N,N-dimethylamino)ethyl]piperazine.

Reaction of the latter with phenylhydrazine in refluxing ethanol in the presence of hydrochloric acid affords 1-[2-(2 - methyl-3-indolyl)ethyl]-4-[2-(N,N-dimethylamino)ethyl]piperazine.

Example 9.—1 - [2 - (2 - phenyl-3-indolyl)ethyl]-4-(N-methyl-4-piperidyl)piperazine [I: $R_1$ is 4—$C_5H_9NCH_3$; $R_2$ is $C_6H_5$; $R_3$ is H; Alk is $CH_2CH_2$]

Reaction of γ-chlorobutyrophenone (Belgian Patent 601,228) with 1-(N-methyl-4-piperidyl)piperazine in the presence of anhydrous sodium carbonate in refluxing xylene affords 1-(3-benzoylpropyl)-4-(N-methyl-4-piperidyl)piperazine.

Reaction of the later with phenylhydrazine in refluxing ethanol in the presence of hydrogen chloride affords 1-[2-(2 - phenyl - 3-indolyl)ethyl]-4-(N-methyl-4-piperidyl)piperazine.

Example 10.—1 - [3 - (1-methyl-3-indolyl)propyl]-4-(N-methyl-4-piperidyl)piperazine [I: $R_1$ is 4—$C_5H_9NCH_3$; $R_2$ is H; $R_3$ is $CH_3$; Alk is $(CH_2)_3$]

By adding 1 - [3 - (3-indolyl)propyl]-4-(N-methyl-4-piperidyl) piperazine to a solution of sodamide in liquid ammonia (prepared by dissolving sodium in liquid ammonia) and treating the resulting solution with a molar equivalent amount of methyl iodide, there is obtained 1-[3-(1 - methyl - 3-indolyl)propyl]-4-(N-methyl-4-piperidyl)piperazine.

Example 11.—1 - [3 - (1-benzyl-3-indolyl)propyl]-4-(N-methyl-4-piperidyl)piperazine [I: $R_1$ is 4—$C_5H_9NCH_3$; $R_2$ is H; $R_3$ is $C_6H_5CH_2$; Alk is $(CH_2)_3$]

By adding 1 - [3 - (3-indolyl)propyl]-4-(N-methyl-4-piperidyl)piperazine to a solution of sodamide in liquid ammonia (prepared by dissolving sodium in liquid ammonia) and treating the resulting solution with a molar equivalent amount of benzyl bromide, there is obtained 1 - [3 - (1 - benzyl - 3 - indolyl)propyl]-4-(N-methyl-4-piperidyl)piperazine.

Example 12.—1-[(3-indolyl)methyl] - 4 - (N-methyl-4-piperidyl)piperazine [I: $R_1$ is 4—$C_5H_9NCH_3$; $R_2$ and $R_3$ are H; Alk is $CH_2$]

By heating a mixture of indole, formalin, and 1-(N-methyl-4-piperidyl)piperazine in the presence of glacial acetic acid, there is obtained 1-[(3-indolyl)methyl]-4-(N-methyl-4-piperidyl)piperazine.

Example 13.—1-[2-(methyl-3-indolyl)ethyl] - 4 - [2-(N-piperidyl)ethyl]piperazine [I: $R_1$ is $C_5H_{10}NCH_2CH_2$; $R_2$ is $CH_3$; $R_3$ is H. Alk is $CH_2CH_2$]

Reaction of 1-(2-chloroethyl)piperazine with piperidine in the presence of anhydrous sodium carbonate in refluxing xylene affords 1-[2-(N-piperidyl)ethyl]piperazine.

Reaction of the latter with 5-chloro-2-pentanone in the presence of anhydrous sodium carbonate in refluxing xylene affords 1-(3-acetylpropyl)-4-[2-(N-piperidyl)ethyl]piperazine.

Reaction of the latter with phenylhydrazine in refluxing ethanol in the presence of hydrogen chloride affords 1-[2-(2-methyl - 3 - indolyl)ethyl]-4-[2-(N-piperidyl)ethyl]piperazine.

Example 14.—1-[2-(2 - methyl-3-indolyl)ethyl]-4-[2-(N-pyrrolidyl)ethyl]piperazine [I: $R_1$ is $C_4H_8NCH_2CH_2$; $R_2$ is $CH_3$; $R_3$ is H; Alk is $CH_2CH_2$]

Reaction of 1-(2-chloroethyl)piperazine with pyrrolidine in the presence of anhydrous sodium carbonate in refluxing xylene affords 1-[2-(N-pyrrolidyl)ethyl]piperazine.

Reaction of the latter with 5-chloro-2-pentanone in the presence of anhydrous sodium carbonate in refluxing xylene affords 1-(3-acetylpropyl) - 4 - [2-(N-pyrrolidyl)ethyl]piperazine.

Reaction of the latter with phenylhydrazine in refluxing ethanol in the presence of hydrogen chloride affords 1-[2-(2-methyl - 3 - indolyl)ethyl]-4-[2-(N-pyrrolidyl)ethyl]piperazine.

As illustrative of the antiinflammatory activity possessed by the compounds of the invention, 1-[4-(3-indolyl)butyl]-4-(N-methyl - 4 - piperidyl)piperazine, described above in Example 2, was tested subcutaneously in rats in the granuloma pouch test described by Selye, Proc. Soc. Exptl. Biol. and Med. 82, 328–333 (1953) and found to produce 62% inhibition of the inflammation at a dose of 25 mg./kg.

As illustrative of the anti-bacterial activity possessed by the compounds of the invention, 1-[3-(3-indolyl)propyl]-4-(N-methyl - 4 - piperidyl)piperazine, described above in Example 1, was administered subcutaneously twice a day for five days at a dose of 100 mg./kg./day to Swiss mice infected with Klebsiella pneumonia bacilli and caused the survival of 40% of the infected mice as compared with 0% survival of control animals. In a similar test at the same dose level, nalidixic acid, a clinically proven gram negative antibacterial agent, also caused a 40% survival of the infected animals.

I claim:
1. A compound having the formula

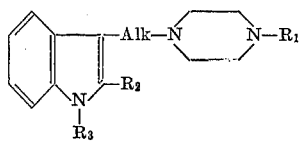

wherein $R_1$ is N-lower-alkyl-3-piperidyl, N-lower-alkyl-4-piperidyl, N-lower-alkyl-3-pyrrolidyl, N - morpholinyl-lower-alkyl, N-piperidyl-lower-alkyl, N-pyrrolidyl-lower-alkyl, or N,N-di-lower-alkylamino-lower-alkyl; $R_2$ is hydrogen, lower-alkyl, or phenyl; $R_3$ is hydrogen, lower-alkyl, or phenyl-lower-alkyl; and Alk is lower-alkylene having from one to seven carbon atoms.

2. 1-[4-(3-indolyl)butyl] - 4 - (N-methyl-4-piperidyl)piperazine according to claim 1 wherein $R_1$ is N-methyl-4-piperidyl; $R_2$ and $R_3$ are hydrogen; and Alk is 1,4-butylene.

3. 1-[3-(3-indolyl)propyl] - 4 - (N-methyl-4-piperidyl)piperazine according to claim 1 wherein $R_1$ is N-methyl-4-piperidyl; $R_2$ and $R_3$ are hydrogen; and Alk is 1,3-propylene.

References Cited
UNITED STATES PATENTS

| | | | |
|---|---|---|---|
| 3,188,313 | 6/1965 | Archer | 260—268 |
| 3,328,407 | 6/1967 | Archer | 260—268 |
| 2,708,197 | 5/1955 | Speeter | 260—326.15 |
| 3,218,333 | 11/1965 | Roozemoud | 260—326.15 X |
| 3,364,224 | 1/1968 | Shavel et al. | 260—326.15 X |

ALEX MAZEL, Primary Examiner

D. G. DAUS, Assistant Examiner

U.S. Cl. X.R.

260—247.5, 294.7, 326.13, 326.15, 544, 546, 556, 601, 603; 424—280

PO-1050
(5/69)

UNITED STATES PATENT OFFICE
CERTIFICATE OF CORRECTION

Patent No. 3,466,287      Dated September 9, 1969

Inventor(s) Sydney Archer

It is certified that error appears in the above-identified patent and that said Letters Patent are hereby corrected as shown below:

Column 2, line 3, "1-[(2-indolyl)" should read --1-[(3-indolyl)--; line 26, "reaciton" should read --reaction--. Column 5, line 59, "atotal" should read --a total--. Column 6, line 38, "(N-methyl-5-piperidyl)" should read --(N-methyl-4-piperidyl)--; line 59, "French Patent 1,355,755" should read --French Patent 1,355,775. Column 7, line 7, "N-methyl-3-pyrrolidone" should read --N-methyl-3-piperidone. Column 8, line 4, "later" should read --latter--; line 38, "1-[2-(methyl-" should read -- 1-[2-(2-methyl- --.

SIGNED AND
SEALED
JUN 2 1970

(SEAL)
Attest:

Edward M. Fletcher, Jr.
Attesting Officer

WILLIAM E. SCHUYLER,
Commissioner of Patents